Patented Feb. 9, 1954

2,668,863

UNITED STATES PATENT OFFICE 2,668,863

PURIFICATION OF ALCOHOLS

William R. Norris, Clark Township, Union County, N. J., assignor to Standard Oil Development Company, a corporation of Delaware No Drawing. Application January 11, 1952, Serial No. 266,100

7 Claims. (Cl. 260—643)

This invention relates to a novel process for the dehydration and purification of $C_3$-$C_4$ alcohols prepared by the hydration of the corresponding olefins. More particularly, this invention relates to a process whereby isopropyl alcohol is dehydrated and purified.

The olefin acid-catalyzed hydration method of preparing $C_3$-$C_4$ alcohols, especially isopropyl alcohol, is well known. Crude isopropyl alcohol may thus be produced by the sulfuric acid catalyzed hydration of propylene by the weak acid method or the strong acid method.

In the former process a relatively rich propylene stream containing about 50-80 volume per cent propylene is absorbed in sulfuric acid of approximately 60 to 80 weight per cent concentrations, preferably 70 weight per cent at about 170° F. and approximately 250 p. s. i. g. pressure to form an extract comprising isopropyl sulfate which is partially hydrolyzed to alcohol during the absorption. The hydrolysis is completed by dilution of the extract with water to approximately 45 weight per cent acid strength and maintaining the extract at a temperature of about 190° F. for a period of about 10 minutes residence time. The hydrolysis products are then distilled in an alcohol regenerator wherein crude alcohol vapors are removed overhead and condensed, and wherein spent sulfuric acid is recovered as bottoms for reconcentration and subsequent re-use in the absorption process. The crude isopropyl alcohol contains approximately 30-60% by volume of isopropyl alcohol, some impurities including hydrocarbons, isopropyl ether, acetone and unknown impurities, and the balance water. The crude alcohol is condensed and cooled and is ready for the purification stage of the process.

In the strong acid process a propylene stream of relatively lower propylene content, i. e., about 30-60 volume per cent propylene, is contacted under similar conditions with a stronger sulfuric acid, e. g., acid of 80-95 weight per cent concentration, preferably 85-88 weight per cent, whereby an extract is formed as above. The extract goes through a similar hydrolysis and stripping treatment to produce a crude isopropyl alcohol as described for the weak-acid process.

When the isopropyl alcohol is purified by conventional fractionation it is led to a heads column the purpose of which is to remove ether and other low-boiling water-insoluble impurities, such as hydrocarbons, hydrocarbon polymers, oxygenated compounds, and unknown impurities. This is accomplished by a steam stripping operation whereby the lighter materials are withdrawn overhead while weak aqueous alcohol is recovered as bottoms. The weak aqueous alcohol is then distilled in a concentrating column where the alcohol is concentrated to a composition approaching its water azeotrope, viz., 91 volume per cent isopropyl alcohol-9 volume per cent water.

This isopropanol is unsatisfactory for many uses because of its excessive water content. An efficient method of further dehydrating this alcohol is by the utilization of caustic alkalies, i. e., sodium hydroxide and potassium hydroxide. The latter are usually utilized in aqueous solutions of 45 to 60 weight per cent concentration. An aqueous layer separates out from the alcohol and the alcohol layer is thus dehydrated to a 95-98 volume per cent product.

This caustic alkali treatment, however, results in the obtaining of a hazy alcohol, such haze especially noticeable when the alcohol is cooled to room temperatures. The haze is still present after further distillation of this thus dehydrated alcohol to obtain a 99 volume per cent product. This haze is apparently due to the presence of either dissolved alkali or alcoholate in the alcohol. In any case, the product is unsatisfactory for commercial use. Filtration is difficult and fails to remove this undesirable haze.

The present invention provides a method for overcoming this difficulty in the caustic alkali dehydrated alcohol. This method comprises treating the hazy alcohol with a small quantity of acetic acid. A homogeneous system is obtained, the haze disappears, and there is no insoluble salt present in the alcohol. The product is satisfactory for commercial use as is, without removing the reaction products produced by the addition of the acetic acid.

It is most desirable to employ the acetic acid as glacial acetic acid so as not to dilute the alcohol excessively. The amount of glacial acetic acid added is only enough to approximately neutralize the alkalinity present in the alcohol as determined by titration. It is uneconomical and undesirable to utilize more acetic acid because corrosion and odor problems would be introduced. Thus only small quantities will be required, i. e., about 0.0002 to 0.0005 volume per cent of glacial acetic acid are usually sufficient to treat the hazy alcohol products so as to obtain clear alcohols and the pH of the product is about 7.

This acetic acid treatment can be performed on the alcohol product obtained immediately subsequent to caustic alkali dehydration, or can be performed directly on the final most anhydrous alcohol, i. e., that rerun in the finishing still so as to give the 99 volume per cent product. The alcohols treated by the process of this invention thus contain no more than about 5 volume per cent water in any case. Their treatment prior to the caustic contacting also rendered them substantially free of contaminants and relatively pure.

It is indeed surprising to find that acetic acid so overcomes the difficulty present in the caustic alkali treated alcohol. The utilization of specifically glacial acetic acid is apparently required in this invention.

The addition of $CO_2$ either in the form of liquid, gas or solid converts the haze to the bicarbonates or carbonates, but filtration is still necessary and extremely difficult. The utilization of mineral acids results in the presence of undesirable, difficultly separable products. Other commercially available organic acids do not give as satisfactory results.

This invention will be better understood by reference to the following example of the utilization of the process of this invention to obtain the desired results.

*Example*

A 91 volume per cent isopropanol obtained by the sulfuric acid catalyzed hydration of propylene was further dehydrated with 45 weight per cent aqueous sodium hydroxide. The thus dehydrated alcohol showed a distinct undesirable haze. This hazy alcohol was further distilled to obtain the 99 volume per cent bottoms product.

The quantity of glacial acetic acid added to this final alcohol, which had been rerun in the finishing still, was .0002–.0005 volume percent so as to neutralize the alkalinity as determined by phenolphthalein titration. A clear product was obtained.

It is to be understood that the present invention is not limited to the specific example, which has been offered merely as an illustration, and that modifications may be made in equipment and conditions within the ranges specified without departing from the spirit of this invention.

What is claimed is:

1. In the purification of a $C_3$–$C_4$ alcohol prepared by a hydration of the corresponding olefin, and wherein a purified aqueous alcohol is obtained on distillation which is subsequently subjected to a dehydration treatment with an aqueous caustic alkali selected from the group consisting of sodium hydroxide and potassium hydroxide which results in the obtaining of an aqueous layer and a hazy, dehydrated alcohol layer containing no more than about 5 volume per cent water, the improvement which comprises adding to the alkali treated alcohol a small quantity of glacial acetic acid in an amount sufficient to approximately neutralize the alkali treated alcohol whereby a clear further purified alcohol is obtained.

2. A process as in claim 1 in which the alcohol being purified is isopropanol.

3. In the purification of a $C_3$–$C_4$ alcohol prepared by a hydration of the corresponding olefin, and wherein a purified aqueous alcohol is obtained on distillation which is subsequently subjected to a dehydration treatment with an aqueous caustic alkali selected from the group consisting of sodium hydroxide and potassium hydroxide which results in the obtaining of an aqueous layer and a hazy dehydrated alcohol layer containing no more than about 5 volume per cent water, followed by another distillation to obtain a more anhydrous alcohol, the improvement which comprises adding to the thus treated alcohol a small quantity of glacial acetic acid in an amount sufficient to approximately neutralize the alkali treated alcohol whereby a clear further purified alcohol is obtained.

4. The process as in claim 3 in which the alcohol being purified is isopropanol.

5. The process as in claim 4 in which the amount of glacial acetic acid added is in the range of approximately 0.0002–0.0005 volume per cent based on the hazy alcohol.

6. The process of claim 1 in which the aqueous caustic alkali utilized is of a 45 to 60 weight per cent concentration.

7. The process of claim 3 in which the aqueous caustic alkali utilized is of a 45 to 60 weight per cent concentration.

WILLIAM R. NORRIS.

References Cited in the file of this patent

UNITED STATES PATENTS

| Number | Name | Date |
|---|---|---|
| 2,080,111 | Bump | May 11, 1937 |
| 2,081,189 | Wiezevich | May 25, 1937 |
| 2,474,569 | Bannon | June 28, 1949 |
| 2,541,673 | Smith | Feb. 13, 1951 |
| 2,586,602 | Beddow | Feb. 19, 1952 |